United States Patent Office 3,428,774
Patented Feb. 18, 1969

3,428,774
METHOD AND APPARATUS FOR OVERLAY WELDING
Hans-Dieter Faust and Wolfgang Rossner, Nuremberg, Germany, assignors to Siemens Aktiengesellschaft, Berlin-Siemensstadt, Germany, a corporation of Germany
Filed June 8, 1965, Ser. No. 462,254
Claims priority, application Germany, June 11, 1964, S 91,465
U.S. Cl. 219—76        14 Claims
Int. Cl. B23k 9/04, 9/10

ABSTRACT OF THE DISCLOSURE

Arc welding method for depositing weld material upon base material by means of an electrode and a cold wire feeding device oscillatively driven conjointly by a cardioid cam includes oscillating the electrode along its oscillation amplitude in a direction toward the side of a previously deposited weld and in a reverse direction, simultaneously feeding cold wire along the oscillation amplitude in an amount fully meltable by current passing through the electrode, and periodically switching the cold wire feeding device on and off when the fed cold wire is at respectively different locations of the oscillation amplitude between and including a location ($X_0$) spaced from a junction location ($X_1$) of succeeding welds and an oscillation reversing location ($X_2$) at the end of an overlapping distance ($X_1-X_2$) between the succeeding welds; and apparatus for carrying out the method.

Our invention relates to a method and apparatus for producing an overlay weld by depositing weld material upon base material by means of oscillating electrodes, and more particularly by means of a welding apparatus employing a cardioid drive for the oscillating electrodes.

In Patent No. 3,185,814 of Wolfgang Rössner et al., a method and apparatus is disclosed wherein the cold-wire feed at the abutting location or joint area of two bead-weld overlays is interrupted. The interruption results from oscillating motion of the electrodes effected by a cardioid drive.

To avoid bonding faults between the two welds and in order to form simultaneously a smooth transition surface free of indentations from one weld to the other, it is an object of our invention to effect an intensified or increased melting therein of the cooled welding bead already present there.

With this and other objects in view, in accordance with the invention, we provide a method of overlay welding which comprises starting and stopping the feed of the cold wire at various locations of the oscillating amplitude. Thus, advantageously the feed of the cold wire is stopped before the cold wire reaches the abutting location with the adjacent bead weld and is resumed in the time interval between the oscillation reversing point and the abutting location of the weld bead II with the adjacent bead I as shown in FIG. 1 of the drawings. To increase the melting of the weld material at the junction of the two welds, the speed of the oscillating electrode is advantageously reduced during the period in which the cold wire feed is discontinued by profiling the cardioid cam. It is of particular advantage, however, to reduce the speed of the oscillating electrodes only during a portion of the period in which the cold wire feed is stopped, preferably during the forward movement of the oscillating electrode to the bead I in the time interval $X_0-X_2$ as shown in FIG. 1. In accordance with another feature of our invention, there is advantageously employed for starting and stopping the feed of the cold wire, a cam preferably mounted on the shaft of the cardioid drive and having a circular groove and associated displaceable switching elements or a cam mounted eccentrically on the shaft of the cardioid drive. Moreover, the cardioid cam proper of the cardioid drive, without intermediate switching of a similar cam-shaped machine element, can also be used for starting and stopping the cold wire feed.

In accordance with yet another aspect of our invention, both the instant of the starting and stopping the cold wire feed as well as the interval during which the cold wire is being fed and not being fed are adjustable or variable during a revolution of the cardioid cam by displacement of a switch plate parallel to the Y axis of the shaft of the cardioid drive or by rotary movement of a carrier plate through a circular sector at a radial distance $r$ about the center point of a coordinate system X–Y (FIG. 3). During actuation of the on-and-off switch of the cold wire drive by the cam with the circular groove, in accordance with a further aspect of our invention, the time interval of starting and stopping the cold wire feed is changeable or adjustable by increasing or decreasing an angle $\alpha$ formed by the switching element and the center point of the shaft of the cardioid drive (FIG. 5), while the instant of switching on and off the feed of the cold wire is adjusted by displacing the switching elements in the circular groove formed on the cam and/or by a rotary displacement of the carrier plate through a circular sector spaced at a radial distance $r$ from the center point of the coordinate system X–Y (FIG. 3). When the starting and stopping of the cold wire drive is effected by a cam mounted eccentrically on the shaft of the cardioid drive, it is another aspect of my invention to make the time interval of starting and stopping the cold wire feed variable or adjustable by displacement of the switching plate parallel to the Y axis of the shaft, while the instant of starting and stopping the cold wire feed is variable or adjustable by mounting the eccentric cam on the shaft of the cardioid drive so that it is turnable with respect to a given point of the peripheral surface of the shaft.

In accordance with an additional aspect of our invention, we provide a resilient intermediate element which, by means of the cardioid cam or the eccentric cam, adjusts the released travel to the switching path of the switch pin.

Other features which are considered as characteristic for the invention are set forth in the appended claims.

Although the invention is illustrated and described herein as method and apparatus for overlay welding, it is nevertheless not intended to be limited to the details shown since various modifications as well as structural changes may be made therein without departing from the spirit of the invention and within the scope and range of equivalents of the claims.

The construction and method of operation of the invention, however, together with additional objects and advantages thereof, will be best understood from the following description of the method and of specific embodiments of the apparatus when read in connection with the accompanying drawings, in which.

Figure 3:
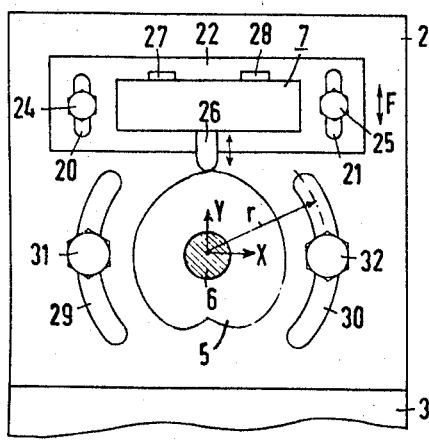
FIGS. 3 and 4 are front and side elevational views respectively of one embodiment of the device for actuating a switch to start and stop the feed of cold wire for use with the apparatus of FIG. 2.
Figure 4:
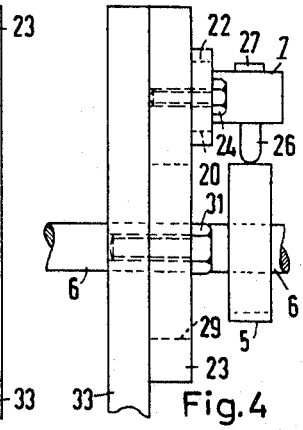
Figure 5:
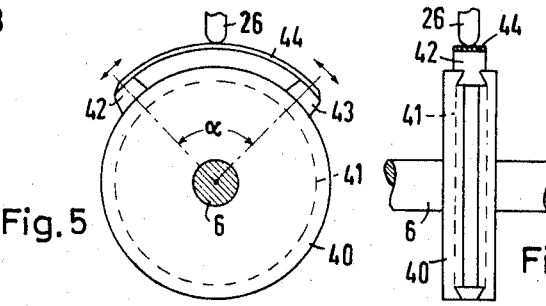
Figure 6:
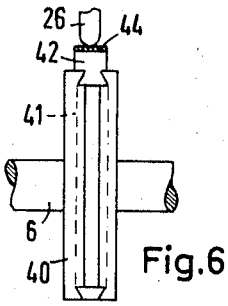
Figure 7:
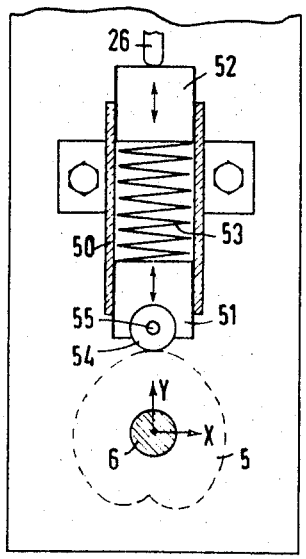
Figure 8:
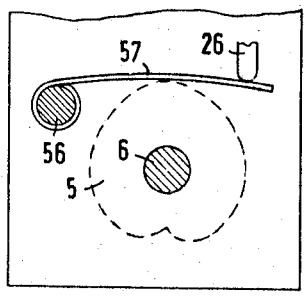

FIGS. 5 and 6 are front and side elevational views respectively of still another embodiment of FIGS. 3 and 4 which includes a cam provided with a circular groove; and FIGS. 7 and 8 are schematic views of further embodiments of the device shown in FIGS. 3 and 4 including resilient intermediate elements.

As foreme ntioned hereinabove, in order to prevent bonding faults an intensified melting is advantageously effected above the transition zone between the bead welds. This can be effected by various means; for example, the arc or welding torch can be made to linger over the transition zone between the bead welds for a longer interval than at the locations of the remainder of the welding path and for another example the cooling effect of the cold wire above the transition zone between the bead welds can advantageously be dispensed with a little sooner.

Figure 1:
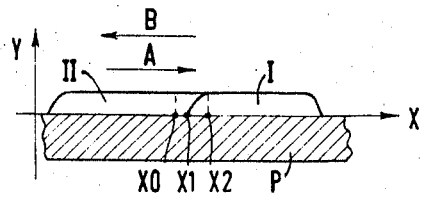
FIG. 1 shows a section of the basic material with two adjacent overlapping welds applied thereto.

FIG. 1 discloses the arrangement in adjacent rows of two bead welds on a base plate P wherein the newly applied bead weld II directly abuts the previously applied bead weld I (abutment location $X_1$) and partly overlaps the latter (overlapping distance $X_1$—$X_2$). Thus during the forward displacement (arrow A) of the welding electrode, the feed of the cold wire is switch off or discontinued at the location $X_0$. The reason for switching off the feed of the cold wire at the location $X_0$ and not first at the abutting or junction location $X_1$ is that the cold wire feed is switched off by mechanical or magnetic switching elements which are subject to time-delaying features and furthermore the first applied bead weld I has already been cooled to such an extent that a great amount of thermal energy is necessary for melting it. On the other hand, for the return motion (arrow B) of the welding electrode, the first applied bead weld I in the overlapping distance $X_1$—$X_2$ is also heated to such an extent that the discontinuance of the cooling effect of the cold wire is no longer necessary to prevent bonding faults, so that switching on the cold wire feed at a desired location of the overlapping distance $X_1$—$X_2$ is possible. The instant of switching on the cold wire feed after reversal of the electrode oscillating direction in the overlapping distance $X_1$–$X_2$ is readily determinable for obtaining the object of achieving a uniform height of the deposition of the weld material at the transition zone between the bead welds, and hence is advantageously able to be temporally phase shifted to the instant of switching off the cold wire feed. It is of particular advantage at the increase of melting of the weld material if a reduction of the oscillating speed of the electrode is carried out simultaneously to the switching off of the cold wire feed. The oscillating speed of the electrode can be reduced for any desired period at a specific location of the welding path by flattening the contour of the cardioid cam. In particular, the slowing down of the electrode oscillating movement only in one direction can be effected by asymmetrical construction of the cardioid cam with respect to the Y axis of the coordinate system X–Y (FIG. 3), for example only when the oscillating electrode runs up over the adjacent bead weld (arrow A), especially in the desired time interval $X_0$—$X_2$, whereas the return motion (arrow B) of the electrode takes place with undiminished speed.

Figure 2:
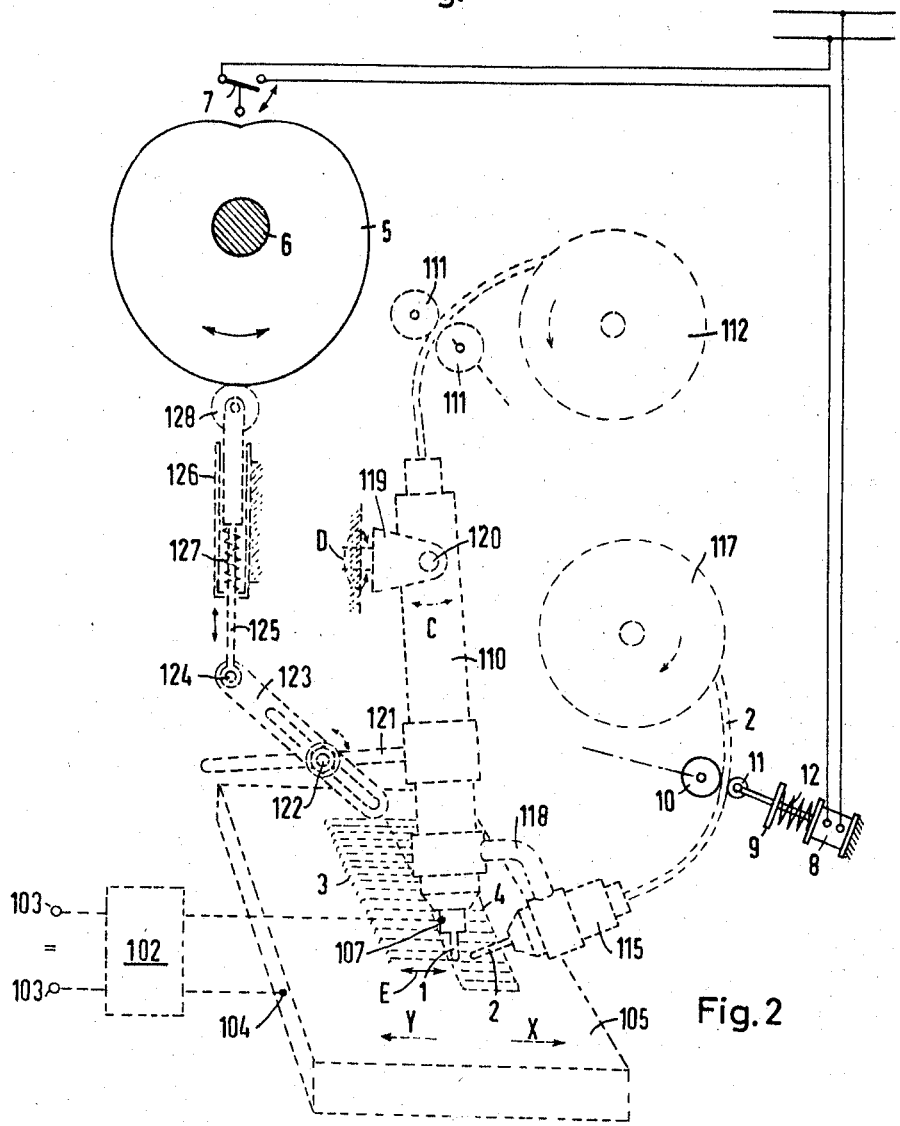
FIG. 2 is a diagrammatic view of welding apparatus for performing the method of the invention.

FIG. 2 shows diagrammatically an electric welding machine 102, energized at terminals 103 by direct current preferably of constant voltage, and having a pole 104 connected to a workpiece 105 upon which bead welds 3 and 4 are deposited. A second pole 107 of the welding machine 102 is connected to a hot-wire electrode 1 supplied with welding wire through a guide 110 from a roll 112. The wire is advanced by two driven feed rollers 111. 2 is held in another guide 115. The cold wire is supplied from a roll 117 and advanced by a feed roller 10 against which is pressed by idler roller 11 journalled on a mechanism described hereinafter in greater detail. Guides 110 and 115 are rigidly connected with each other by a holder 118, thus forming a unit that can be laterally shifted by means of a rigid arm 121. The guide 110 is journalled in a bracket 119 on a pivot pin 120 so as to be rotatable about the pivot axis of pin 120 as indicated by an arrow C. The bracket 119 has a pivot pin extending at a right angle to pin 120 and revolvably mounted on a fixed support so that the bracket 119 and the guide 110 can also rotate about the axis of a second pivot pin as indicated by another arrow D. The rigid structure of electrodes 1, 2 is thus capable of spherical or universal motion. The journal pins for wire rolls 112, 117 and the feed rolls 111, 10 as well as the appertaining drives may all be mounted on the same structure so as to participate in the oscillating motion of the electrode assembly.

The arm 121 is secured to the guide 110 and is removably connected with a slotted lever 123 by means of a pivot 122 that can be clamped fast to arm 121 at any selected distance from the guide 110. The upper end of the slotted lever 123 is attached to one end of a tappet rod 125 by an articulated joint 124. Rotatable on a journal pin at the upper end of rod 125 is a roller 128 riding on a cam 5 of cardioid-shaped contour. The rod 125 is guided in a fixedly mounted bushing 126 and is pressed against the cam contour by a spring 127. The cam 5 is mounted on a drive shaft 6 which is driven by a suitable drive (not illustrated). Due to the rotation of the cam 5, the tappet rod 125 is reciprocated in its axial direction. The tappet movement is transmitted to the electrodes 1, 2 by the slotted lever 123 and the arm 121. This electrode movement is in a direction indicated by a double-headed arrow E which is transverse to the main or advancing direction of the overlap weld being produced. Superimposed upon the oscillating motion of the electrode assembly according to arrow E is an advancing motion of the entire electrode assembly or of the workpiece 105 in the direction of the overlay weld substantially perpendicular to the direction of the arrow E. By shifting the clamping joint 122 along the arm 121, the amplitude of the oscillating movement and thereby also the width of the bead weld can be adjusted. Increasing the distance between the joint 122 and the guide 110 decreases the amplitude of the electrode oscillation.

When the electrode 1 and the cold wire 2 swing outwardly in the direction of the arrow X, shortly before they reach the abutment location of the bead weld 3 with the previously applied bead weld 4, a sensing switch 7 is closed in a manner and by devices described hereinafter in greater detail, and a magnet coil 8 is thereby electrically energized from a suitable line source. The magnet coil 8 actuates a movable iron core 9 to draw the pressure roller 11, located opposite to the drive roller 10, toward the coil 8 so as to remove the pressure exerted by the roller 10 against the wire 2. The wire 2 is accordingly advanced no longer by the roller 10 through the guide 115. When the electrode 1 and the cold wire 2 move over the bead weld 4 in the direction of the arrow Y after the reversal point, as shown in FIG. 1, the sensing switch 7 is again opened in the time interval $X_1$—$X_2$ by the hereinafter more fully described means, the current supplied to the magnet coil 8 is interrupted and the roller 11 is pressed against the cold wire 2 by means of spring 12 and the cold wire is again advanced by the drive roller 10.

In the embodiment shown in FIGS. 3 and 4, the electrode oscillating motion is produced by a cardioid cam 5 which is driven by a shaft 6. The sensing switch 7 is located above the shaft 6 and is mounted on a switch plate 22 provided with two elongated holes 20 and 21 so that it is displaceable in a direction parallel to the Y axis of the shaft 6, as is indicated by the arrow F. Two screws or bolts 24 and 25 serve to secure the displaceable switch plate 22 on a carrier plate 23. The sensing switch 7 is provided with a sensing pin 26 which energizes the magnet coil 8 of FIG. 2 by bringing the contacts 27 and 28 into electrical connection. The carrier plate 23 is also provided with elongated holes 29 and 30 and is rotatable through a sector of a circle with the radius r about the center point of the coordinate system X–Y. The screws 31 and 32 serve for securing the carrier plate 23 in a desired position within the aforementioned circular sector by means of the elongated holes 29 and 30. A base plate 33 serves as support for the entire assembly.

The operation of the apparatus constructed in accordance with our invention is as follows:

The switch plate 22 can be displaced back and forth parallel to the Y axis of the shaft 6 for regulating the time interval between switching the cold wire feed on and off. A displacement in the direction toward the zero point of the coordinate system X–Y effects an increase in the length of the time interval during which the cold wire feed is shut off, whereas a displacement in the direction away from the zero point of the coordinate system X–Y effects a shortening of the interval during which the cold wire feed is shut off. By means of a rotary motion of the carrier plate 23 in a circular sector having a radial distance $r$ about the zero point of the coordinate system X–Y, the instant of switching the cold wire feed on and off, respectively, can be established as desired preferably so that the cold wire feed is switched off shortly before reaching the abutment location $X_1$ of the new bead weld II with the first applied bead weld I and is switched on once again between the oscillation reversing point $X_2$ and the abutment location $X_1$ (as shown in FIG. 1).

Figure 4A:
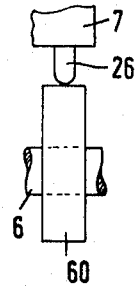
FIG. 4a is a fragmentary view of another embodiment of FIG. 4 which includes an eccentric cam.

Whereas FIGS. 3 and 4 show the operation of the sensor switch 7 by suitable actuation of the switch pin 26 by the cardioid cam 5 proper, in the modification shown in FIG. 4a, the switch pin 26 is regulated by an eccentric cam 60 mounted on the shaft 6. The eccentric cam 60 can be of any suitable shape to provide the necessary time intervals between turning the feed of cold wire on and off.

In FIGS. 5 and 6 is shown another embodiment of my invention in which the switch pin 26 is controlled by a cam 40 mounted on the shaft of the cardioid drive and provided with a circular groove 41 and displaceable switching elements 42, 43, 44. The circular groove 41 is preferably dove-tail shaped. The switch elements 42 and 43 are fastened by pin screws or similar fastening elements at a desired location in the dove-tail groove 41. By means of a steel band 44 secured on the switching elements 42 and 43, the magnet coil 8 shown in FIG. 2 is energized by the switching pin 26 of the sensing switch 7. The time interval of switching the cold wire feed on and off can be varied by increasing or reducing the angle $\alpha$, e.g., by changing the spacing as desired of the switching elements 42 and 43 with respect to one another. Instead of the two switching elements 42 and 43 and the steel band 44, the switching pin 26 can also be actuated instead by a single switch element (not shown). If it is desired to vary the time interval of switching the cold wire feed on and off, this single switch element must, however, then be replaced by a suitable wider or narrower switch element in the peripheral direction of the disc 40. It is of particular advantage that all locations of the welding path are selectable for switching the cold wire feed on and off by means of the selectively displaceable attachment of the switching elements 42 and 43 along the entire periphery of the disc 40. It is thereby possible to add a new bead weld at both sides of the bead of a previously applied bead weld, so that the new bead weld overlaps the old bead weld.

FIGS. 7 and 8 show two different embodiments employing a resilient intermediate element by which the released stroke can be adjusted to the switching path of the switch pin 26 by means of the cardioid cam 5, for example as shown in FIGS. 7 and 8 but also by means of the eccentric cam 60 or the disc 40 with the circular groove and associated switching elements 42, 43, 44. In a cylinder 50 there are located two pistons 51 and 52 that are reciprocable in the direction of or parallel to the Y axis of the shaft 6. A force-storing device, preferably a helical spring 53, is located between the pistons 51 and 52. To transfer the travel or lift of the cardioid cam 5 to the piston 51, a roller 54 is displaceably journalled on a shaft 55 mounted on the piston 51. By means of the force-storing device, the entire lift or stroke produced by rotation of the cardioid cam 5, the eccentric cam 60 or the disc 40 with groove 41 and associated switch elements 42 to 44, is not transferred by the pistons 51 and 52 to the switch pin 56 but rather a portion of the lift is absorbed and damped by the spring 53. In a similar manner as by means of the spring 53 in FIG. 7, a portion of the lift or displacement produced by the rotation of the cardioid cam 5, the eccentrically arranged cam 60 or the disc 40 with groove 41 and associated switch elements 42 to 44, is absorbed and damped by the leaf spring 57 secured to a shaft 56, as shown in FIG. 8, and only the lift remaining after change in form of the leaf spring 57 is transferred to the switch pin 26.

We claim:

1. Arc welding apparatus for depositing welding material upon base material, comprising arc welding means having a pivoted electrode member and cold wire guide member, drive means operatively connected with said member pair for oscillating it about its pivot at a given amplitude, welding-wire supply means for feeding cold wire through one of said members, second wire supply means for feeding wire through said other member, and switch means for stopping the cold wire feed at a location $X_0$ spaced from a junction location $X_1$ of succeeding welds, and starting the electrode cold wire feed at varying locations along the amplitude of oscillation of said member pair between and including an oscillation reversing location $X_2$ at the end of an overlapping distance $X_1-X_2$ between the succeeding welds and said location $X_0$.

2. Arc welding apparatus for depositing welding material upon base material, comprising arc welding means having a pivoted electrode member and cold wire member, drive means operatively connected with said member pair for oscillating it about its pivot at a given amplitude, said drive means comprising a rotary shaft and a cardioid cam mounted for rotation on said shaft, welding-wire supply means for feeding cold wire through one of said members, second wire supply means for feeding wire through said other member, and switch means for stopping the cold wire feed at a location $X_0$ spaced from a junction location $X_1$ of succeeding welds, and starting the electrode cold wire feed at varying locations along the amplitude of oscillation of said member pair between and including an oscillation reversing location $X_2$ at the end of an overlapping distance $X_1-X_2$ between the succeeding welds and said location $X_0$, said switch means comprising a switch adapted to switch the cold wire feed on and off and a disc mounted on said rotary shaft for rotation therewith and formed with a circular groove, said disc having a plurality of switch elements displaceably located in said circular groove for actuating said switch during rotation of said disc.

3. Arc welding apparatus for depositing welding material upon base material, comprising arc welding means having a pivoted electrode member and cold wire guide member, drive means operatively connected with said member pair for oscillating it about its pivot at a given amplitude, said drive means comprising a rotary shaft and a cardioid cam mounted for rotation on said shaft, welding-wire supply means for feeding cold wire through one of said members, second wire supply means for feeding wire through said other member, and switch means for stopping the cold wire feed at varying locations along the amplitude of oscillation of said member pair between and including an oscillation reversing location $X_2$ at the end of an overlapping distance $X_1-X_2$ between the succeeding welds and said location $X_0$, said switch means comprising a switch adapted to switch the cold wire feed on and off, said cardioid cam being operatively engageable with said switch for actuating said switch during rotation of said cardioid cam.

4. Arc welding apparatus for depositing welding material upon base material, comprising arc welding means having a pivoted electrode member and cold wire member, drive means operatively connected with said member pair for oscillating it about its pivot at a given amplitude, said drive means comprising a rotary shaft and a cardioid cam mounted for rotation on said shaft, welding-wire supply means for feeding cold wire through one of said members, second wire supply means for feeding wire through said other member, and switch means for stopping the cold wire feed at a location $X_0$ spaced from a junction location $X_1$ of succeeding welds, and starting the electrode cold wire feed at varying locations along the amplitude of oscillation of said member pair between and including an oscillation reversing location $X_2$ at the end of an overlapping distance $X_1-X_2$ between the succeeding welds and said location $X_0$, said switch means comprising a switch adapted to switch the cold wire feed on and off, and an eccentric cam rotatably mounted on said rotary shaft for actuating said switch during rotation of said eccentric cam.

5. Arc welding apparatus for depositing welding material upon base material, comprising arc welding means having a pivoted electrode member and cold wire guide member, drive means operatively connected with said member pair for oscillating it about its pivot at a given amplitude, said drive means comprising a rotary shaft and a cardioid cam mounted for rotation on said shaft, welding-wire supply means for feeding cold wire through one of said members, second wire supply means for feeding wire through said other member, and switch means for stopping the cold wire feed at a location $X_0$ spaced from a junction location $X_1$ of succeeding welds, and starting the electrode cold wire feed at varying locations among the amplitude of oscillation of said member pair between and including an oscillation reversing location $X_2$ at the end of an overlapping distance $X_1-X_2$ between the succeeding welds and said location $X_0$, said switch means comprising a switch adapted to switch the cold wire feed on and off, said cardioid cam being operatively engageable with said switch for actuating said switch during rotation of said cardioid cam, said switch being mounted on a switch plate and said switch plate being adjustably fastened to a carrier plate, said switch plate together with said switch being displaceable relative to said carrier plate and said shaft in a direction parallel to a transverse axis of said shaft, and said carrier plate together with said switch plate and said switch being turnable through a sector of a circle about the longitudinal axis of said shaft so as to vary the respective instants of switching the cold wire feed on and off and the time interval therebetween during a revolution of said cardioid cam.

6. Arc welding apparatus for depositing welding material upon base material, comprising arc welding means having a pivoted electrode member and cold wire member, drive means operatively connected with said member pair for oscillating it about its pivot at a given amplitude, said drive means comprising a rotary shaft and a cardioid cam mounted for rotation on said shaft, welding-wire supply means for feeding cold wire through one of said members, second wire supply means for feeding wire through said other member, and switch means for stopping the cold wire feed at a location $X_0$ spaced from a junction location $X_1$ of succeeding welds, and starting the electrode cold wire feed at varying locations along the amplitude of oscillation of said member pair between and including an oscillation reversing location $X_2$ at the end of an overlapping distance $X_1-X_2$ between the succeeding welds and said location $X_0$, said switch means comprising a switch adapted to switch the cold wire feed on and off and a disc mounted on said rotary shaft for rotation therewith and formed with a circular groove, said disc having a plurality of switch elements displaceably located in said circular groove for actuating said switch during rotation of said disc, said switch elements being displaceable in said circular groove toward and away from each other for respectively reducing and enlarging an angle α formed by said switch elements and a point on the longitudinal axis of said shaft so as to vary the respective instants of switching the cold wire feed on and off and the time interval, therebetween during a revolution of said cardioid cam.

7. Arc welding apparatus for depositing welding material upon base material, comprising arc welding means having a pivoted electrode member and cold wire member, drive means operatively connected with said member pair for oscillating it about its pivot at a given amplitude, said drive means comprising a rotary shaft and a cardioid cam mounted for rotation on said shaft, welding-wire supply means for feeding cold wire though one of said members, second wire supply means for feeding wire through said other member, and switch means for stopping the cold wire feed at a location $X_0$ spaced from a junction location $X_1$ of succeeding welds, and starting the electrode cold wire feed at varying locations along the amplitude of oscillation of said member pair between and including an oscillation reversing location $X_2$ at the end of an overlapping distance $X_1-X_2$ between the succeeding welds and said location $X_0$, said switch means comprising a switch adapted to switch the cold wire feed on and off and a disc mounted on said rotary shaft for rotation therewith and formed with a circular groove, said disc having a plurality of switch elements displaceably located in said circular groove for actuating said switch during rotation of said disc, said switch elements being displaceable in said circular groove toward and away from each other for respectively reducing and enlarging an angle $a$ formed by said switch elements and a point on the longitudinal axis of said shaft so as to vary the time interval between switching the cold wire feed on and off during a revolution of said disc, said switch being carried by a carrier plate and being turnable therewith through a sector of a circle about said longitudinal axis so as to vary the instants of switching the cold wire feed on and off respectively during a revolution of said disc.

8. Arc welding apparatus for depositing welding material upon base material, comprising arc welding means having a pivoted electrode member and cold wire member, drive means operatively connected with said member pair for oscillating it about its pivot at a given amplitude, said drive means comprising a rotary shaft and a cardioid cam mounted for rotation on said shaft, welding-wire supply means for feeding cold wire through one of said members, second wire supply means for feeding wire through said other member, and switch means for stopping the cold wire feed at a location $X_0$ spaced from a junction location $X_1$ of succeeding welds, and starting the electrode cold wire feed at varying locations along the amplitude of oscillation of said member pair between and including an oscillation reversing location $X_2$ at the end of an overlapping distance $X_1-X_2$ between the succeeding welds and said location $X_0$, said switch means comprising a switch adapted to switch the cold wire feed on and off, and an eccentric cam rotatably mounted on said rotary shaft for actuating said switch during rotation of said eccentric cam, said switch being mounted on a switch plate, said switch plate together with said switch being displaceable in a direction parallel to a transverse axis of said shaft so as to vary the time interval between the instants of switching the cold wire feed on and off respectively during a revolution of said eccentric cam, said eccentric cam being adjustably turnable about the periphery of said shaft so as to vary the instants of switching the cold wire feed on and off respectively during a revolution of said eccentric cam.

9. Apparatus according to claim 3 wherein said switch is provided with a displaceable switch pin, and a resilient element is located intermediate said cardioid cam and said switch pin for accommodating the lift of said cardioid cam to the displacement path of said switch pin.

10. Apparatus according to claim 4 wherein said switch is provided with a displaceable switch pin, and a resilient element is located intermediate said eccentric cam and said switch pin for accommodating the lift of said eccentric cam to the displacement path of said switch pin.

11. Arc welding method for depositing weld material upon base material by means of an electrode and a cold wire feeding device oscillatively driven conjointly by a cardioid cam which comprises oscillating the electrode along its oscillation amplitude in a direction toward the side of a previously deposited weld and in a reverse direction, simultaneously feeding cold wire along the oscillation amplitude in an amount fully meltable by current passing through the electrode, and switching the cold wire feeding device off when the fed cold wire is at a location $X_0$ spaced from a junction location $X_1$ of succeeding welds, and switching the cold wire feeding device on at respectively different locations of the oscillation amplitude between and including an oscillation reversing location $X_2$ at the end of an overlapping distance $X_1$—$X_2$ between the succeeding welds and said location $X_0$.

12. Arc welding method for depositing weld material upon base material by means of an electrode and a cold-wire feeding device oscillatively driven conjointly by a cardioid cam, which comprises passing the electrode and cold-wire feeding device along an oscillation amplitude in a forward direction toward a junction location at the side of a previously deposited weld and beyond the junction location to an oscillation reversal point located at the end of an overlapping distance along the previously deposited weld, and in a reverse direction away from the oscillation reversal point; simultaneously feeding cold wire along the oscillation amplitude in an amount fully meltable by current passing through the electrode; switching off the cold wire feeding device at a given discontinued location before the cold wire reaches the junction location as the cold-wire feeding device is being passed in the forward oscillation direction; and switching on the cold-wire feeding device at a location between the oscillation reversal point and the junction location as the cold-wire feeding device is being passed in the reverse oscillation direction.

13. Arc welding method for depositing weld material upon base material by means of an electrode and a cold wire feeding device oscillatively driven conjointly by a cardioid cam, which comprises oscillating the electrode along its oscillation amplitude at a given speed in a direction toward the side of a previously deposited weld and in a reverse direction, simultaneously feeding cold wire along the oscillation amplitude in an amount fully meltable by current passing through the electrode switching the cold-wire feeding device off when the fed cold wire is at a location $X_0$ spaced from a junction location $X_1$ of succeeding welds, and a switching the cold wire feeding device on at respectively different locations of the oscillation amplitude between and including an oscillation reversing location $X_2$ at the end of an overlapping distance $X_1$—$X_2$ between the succeeding welds and said location $X_0$, and reducing the given speed of the oscillating electrode during the time interval in which the cold-wire feeding device is switched off.

14. Arc welding method for depositing weld material upon base material by means of an electrode and a cold-wire feeding device oscillatively driven conjointly by a cardioid cam, which comprises passing the electrode and cold-wire feeding device along an oscillation amplitude at a given speed in a forward direction toward a junction location at the side of a previously deposited weld and beyond the junction location to an oscillation reversal point located at the end of an overlapping distance along the previously deposited weld, and in a reverse direction away from the oscillation reversal point; simultaneously feeding cold wire along the oscillation amplitude in an amount fully meltable by current passing through the electrode; switching off the cold wire feeding device at a given discontinued location before the cold wire reaches the junction location as the cold-wire feeding device is being passed in the forward oscillation direction; switching on the cold-wire feeding device at a location between the oscillation reversal point and the junction location as the cold-wire feeding device is being passed in the reverse oscillation direction, and reducing the given speed of the oscillating electrode only during the forward feeding thereof to the previously deposited weld between and including the given discontinued location and the oscillation reversal point in which the cold-wire feeding device is switched off.

References Cited

UNITED STATES PATENTS 3,185,814   5/1965   Rösner et al. _____ 219—76

RICHARD M. WOOD, *Primary Examiner.*

J. G. SMITH, *Assistant Examiner.*

U.S. Cl. X.R.

219—130, 137